United States Patent [19]

Weber

[11] Patent Number: 4,580,804

[45] Date of Patent: Apr. 8, 1986

[54] JACK STAND FOR MOTORCYCLES

[76] Inventor: Donald Weber, 1453 Langhorne-Newtown Rd., Langhorne, Pa. 19047

[21] Appl. No.: 631,453

[22] Filed: Jul. 16, 1984

[51] Int. Cl.$^4$ .......................... B62H 1/02; B62H 1/06
[52] U.S. Cl. .................................. 280/300; 180/219; 248/188.5; 254/94; 280/304
[58] Field of Search ............... 280/293, 297, 298, 299, 280/300, 301, 302, 303, 304; 180/219; 248/354.4, 407, 188.5; 254/94; 70/235, 62

[56] References Cited

U.S. PATENT DOCUMENTS

| | | | |
|---|---|---|---|
| 453,094 | 5/1891 | Taylor | 280/304 |
| 611,374 | 9/1898 | Bundick | 280/298 |
| 617,028 | 1/1899 | Koehler | 280/303 |
| 619,646 | 2/1899 | Ward | 280/296 |
| 1,105,353 | 7/1914 | Kronenbitter | 280/299 |
| 1,156,567 | 10/1915 | Vermeer | 280/299 |
| 1,195,404 | 8/1916 | Scott | 280/299 |
| 1,254,624 | 1/1918 | Betts and Corey | 280/299 |
| 2,791,441 | 5/1957 | Phillips | 280/302 |
| 3,591,202 | 7/1971 | Larsen | 280/303 |
| 4,358,127 | 11/1982 | Kissick | 280/303 |
| 4,432,562 | 2/1984 | Cline | 280/300 |

FOREIGN PATENT DOCUMENTS

| | | | |
|---|---|---|---|
| 372310 | 3/1907 | France | 280/304 |
| 492281 | 3/1954 | Italy | 280/304 |
| 726407 | 3/1955 | United Kingdom | 280/293 |

Primary Examiner—John J. Love
Assistant Examiner—Charles R. Watts
Attorney, Agent, or Firm—Howson and Howson

[57] ABSTRACT

A pair of retractable leg assemblies for use in raising the frame of a motorcycle from the ground to permit servicing the same is disclosed. Each leg assembly includes a pair of telescopically engaged members having a cooperating pin and slot arrangement which enables them to be extended and locked simply by extending and twisting the same. Latching mechanisms are provided for releasably retaining the leg assemblies in either the retracted position for riding or the extended position for jacking. One of the leg assemblies enables the motorcycle to be jacked by rocking it side to side.

10 Claims, 11 Drawing Figures

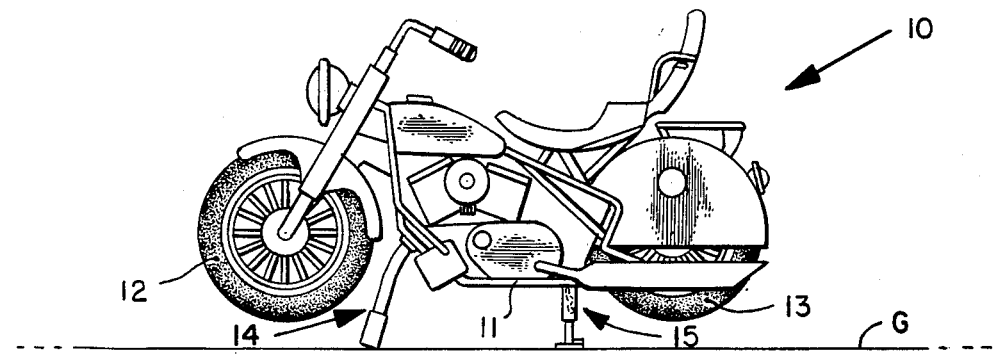
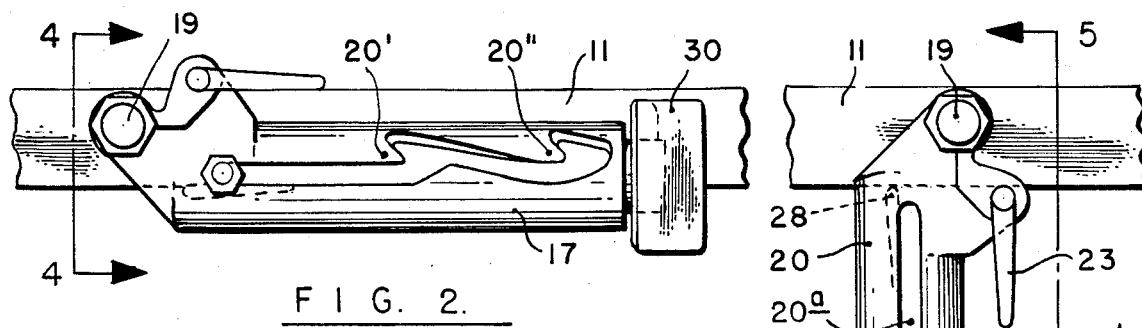
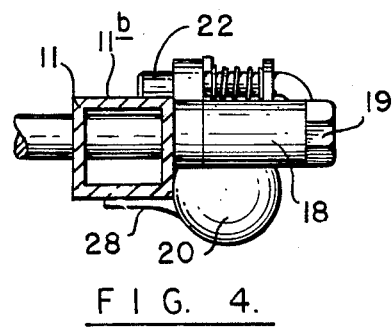
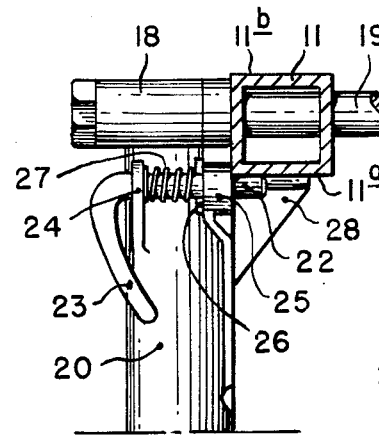
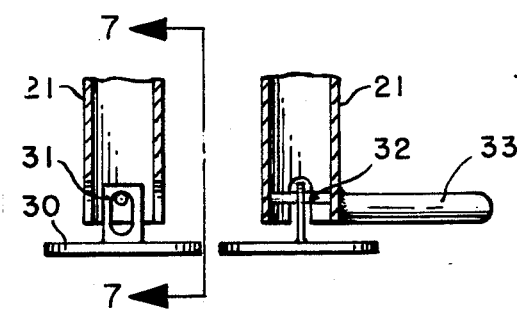
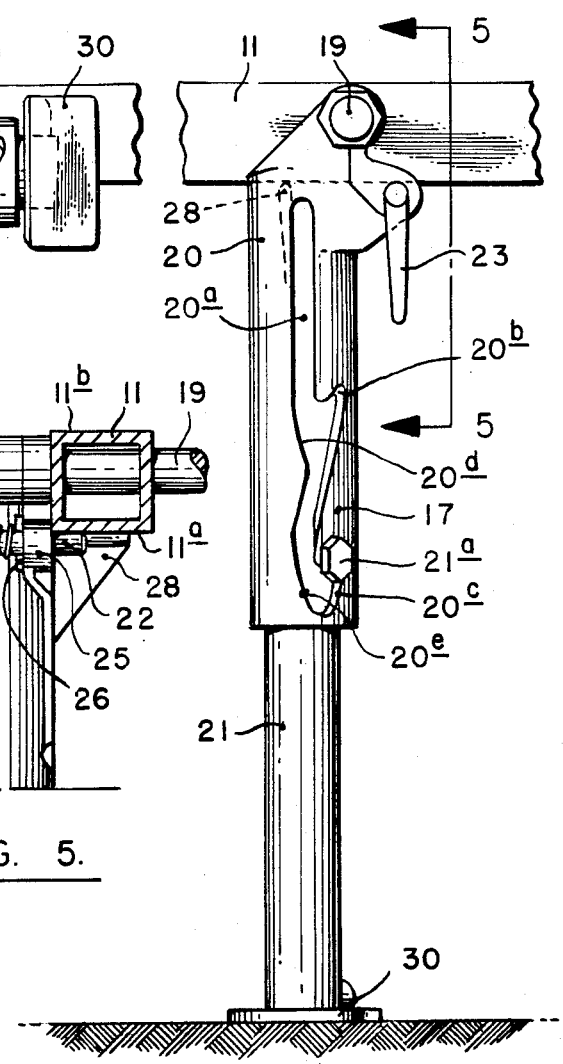

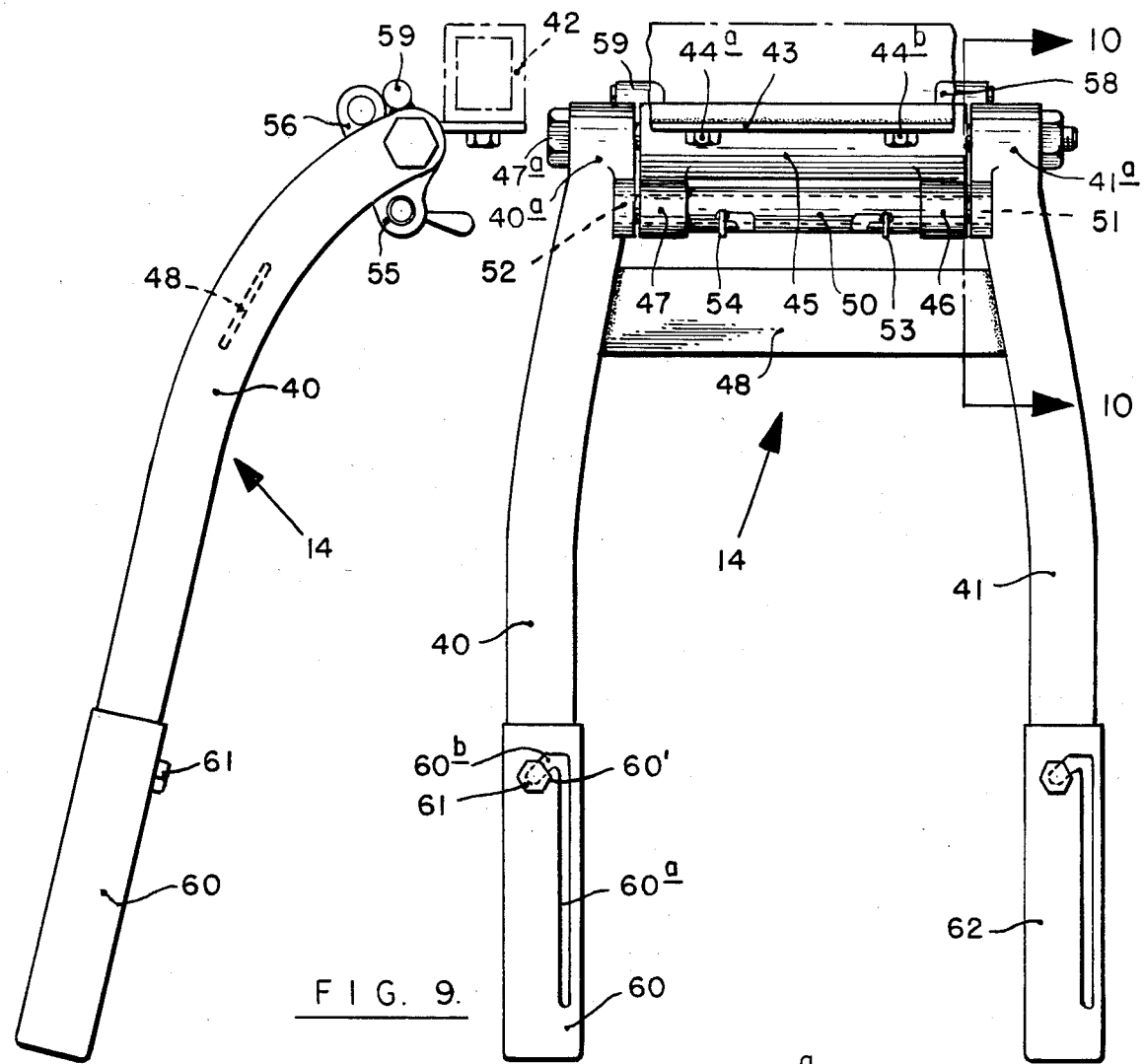
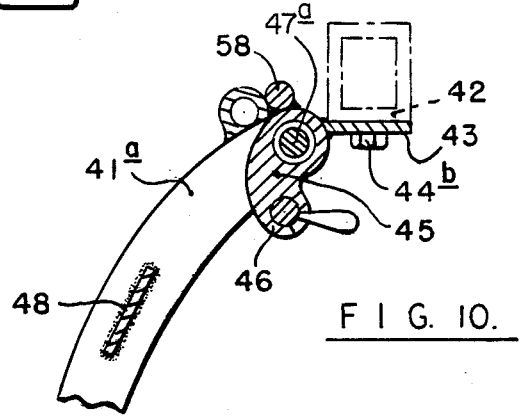
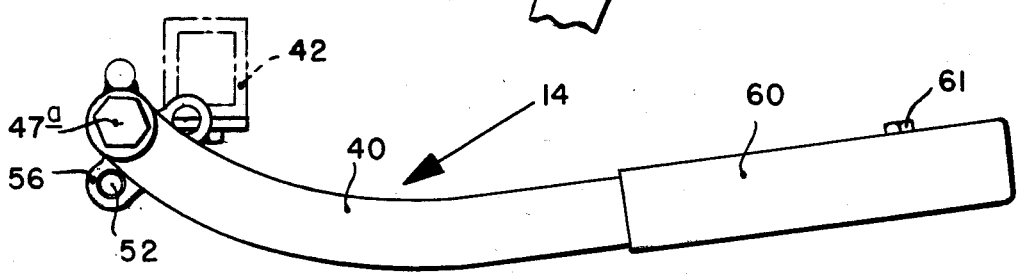
FIG. 8.  FIG. 9.  FIG. 10.  FIG. 11.

JACK STAND FOR MOTORCYCLES

FIELD OF THE INVENTION

The present invention relates to motorcycle stands, and more particularly, the present invention relates to motorcycle stands which are capable both of supporting the motorcycle frame above the ground and of jacking the same by rocking the motorcycle.

BACKGROUND OF THE INVENTION

Occasionally, it is necessary for a motorcycle to be jacked up to permit service work to be performed, such as changing tires, repairing flat tires, chain repair or replacement, etc. Much of this work can be performed at home by the average cyclist, however, the absence of a simple and inexpensive means to raise the frame and wheels off the ground to afford servicing has been a drawback to the do-it-yourself mechanic. Also, since it is sometimes necessary for such service work to be performed on the road, there is a need for a compact, lightweight jack stand which can be carried on the motorcycle and set-up readily to enable emergency repairs to be made quickly.

BRIEF DESCRIPTION OF THE PRIOR ART

U.S. Pat. Nos. 2,791,441 and 3,591,202 both disclose retractable stands for the front of the frame of a motorcycle to enable the front wheel to be elevated from the ground. These stands enable the rear wheel to remain on the ground so that the motorcycle may be driven off the stand. When that occurs, the front stand automatically assumes a retracted position.

U.S. Pat. Nos. 4,358,127 and 4,432,562 both disclose motorcycle support stands which are capable of elevating the motorcycle frame from the ground. While both of these devices may function satisfactorily for their intended purposes, each is relatively complex and hence expensive to manufacture and maintain.

U.S. Pat. Nos. 1,105,353; 1,156,567; 1,195,404; and 1,254,624 disclose various types of stands particularly suited for use with motorcycles to enable the rear wheels to be elevated from the ground.

U.S. Pat. Nos. 611,374 and 619,646 both disclose bicycle stands comprising telescopically extendible members engageable between the bicycle frame and the ground to support the bicycle when not in use.

OBJECTS OF THE INVENTION

With the foregoing in mind, it is a primary object of the present invention to provide a novel motorcycle jack stand which is capable of supporting a motorcycle safely above the ground to permit servicing.

Another object of the present invention is to provide an improved motorcycle jack stand which is capable of being retracted alongside the frame when not in use yet which can be extended readily when required to lift the frame from the ground.

A further object of the present invention is to provide a unique motorcycle jack stand which includes telescopic leg members cooperating when extended to permit the motorcycle to be jacked up by rocking the motorcycle side to side.

Yet another object of the present invention is to provide a motorcycle jack stand which is simple in design, light in weight, rugged in construction, easy to set-up, and capable of being manufactured economically.

SUMMARY OF THE INVENTION

More specifically, the present invention provides a motorcycle jack stand which is normally retracted when the motorcycle is in use but which is capable of being set-up readily for use in jacking the motorcycle such as to change a tire. To this end, the jack stand includes a front support assembly which is mounted adjacent to the front of the motorcycle frame behind the front wheel and a rear support assembly which is mounted to the frame ahead of the rear wheel. Each support assembly includes a pair of telescopic leg assemblies mounted to pivot relative to the frame and means for releasably securing each leg assembly either in a retracted position extending alongside the frame or in an extended position depending therefrom. Each leg assembly includes a pair of tubular members which telescope with respect to one another. One of the members is provided with a pin, and the other is provided with a slot having a predetermined shape for slidably receiving the pin. The slot has an inclined, laterally-offset locking portion which cooperates with the pin to prevent collapse of the leg assembly after it has been extended and rotated into its locking position. The slots in the rear assemblies are provided with intermediate locking positions to enable the telescopic members to be releasably locked in selected positions for supporting the motorcycle at various levels. The intermediate locking portion of the slot enables the frame to be jacked up by first tilting the motorcycle to one side while simultaneously extending and twisting the leg assembly on one side of the frame until the pin engages in the locking portion of the slot, and then tilting the motorcycle in the opposite direction while similarly manipulating the leg assembly on the other side of the frame. The leg assemblies are pivotally mounted to the frame and have releasable latch assemblies which cooperate with the frame to lock the leg assemblies either in their retracted or extended positions.

BRIEF DESCRIPTION OF THE DRAWINGS

The foregoing and other objects, features and advantages of the present invention should become apparent from the following description when taken in conjunction with the accompanying drawings, in which:

FIG. 1 is a side elevational view in reduced scale of a motorcycle supported above the ground on a jack stand embodying the present invention;

FIG. 2 is a side elevational view of one of the rear leg assemblies in its retracted position alongside the motorcycle frame;

FIG. 3 is a side elevational view of the leg assembly of FIG. 2 shown in its downwardly extended position;

FIG. 4 is a sectional view taken on line 4—4 of FIG. 2;

FIG. 5 is a sectional view taken on line 5—5 of FIG. 3;

FIG. 6 is a fragmentary sectional view of the lower portion of the leg assembly of FIGS. 2 and 3;

FIG. 7 is a view taken on line 7—7 of FIG. 6;

FIG. 8 is a side elevational view of the front leg assembly;

FIG. 9 is a rear elevational view of the front leg assembly, the view looking leftward in FIG. 8;

FIG. 10 is a fragmentary sectional view taken on line 10—10 of FIG. 9; and

FIG. 11 is a view similar to FIG. 8 but illustrating the front leg assembly in a retracted position.

DESCRIPTION OF THE PREFERRED EMBODIMENT

Referring now to the drawings, FIG. 1 illustrates a motorcycle 10 of conventional construction having a frame with parallel fore and aft frame members 11 and front and rear wheels 12 and 13, respectively. The motorcycle 10 is shown with the frame jacked from the ground G by a jack stand assembly 14, 15 embodying the present invention. The jack stand assembly 14, 15 includes a front jack stand 14 and a rear jack stand 15.

As will be described, according to the present invention, the rear jack stand assembly 15 enables the rear wheel 13 to be jacked up by rocking the motorcycle 10 from side to side, and the front jack stand assembly 14 enables the front wheel 12 to be raised by tilting the motorcycle about a transverse horizontal axis after the rear wheel has been jacked-up.

The rear jack stand assembly 15 comprises two leg assemblies mounted to the motorcycle frame outboard of the rear wheel 13 and forwardly thereof. Both of the leg assemblies are of like construction so that reference hereinafter will be made to the leg assembly 17 on the left hand side of the motorcycle frame. The jack stands 14 and 15 are capable of being carried in a compact retracted position alongside the motorcycle frame 11 and of being extended in the manner illustrated in FIG. 1 to enable the motorcycle 10 to be jacked-up and serviced. As best seen in FIG. 2, the left hand leg assembly 17 of the rear jack stand 15 is normally disposed substantially parallel with the horizontally extending portion of the frame member 11 when the leg assembly 17 is in its retracted position such as when the motorcycle is being ridden. As best seen in FIG. 3, the leg assembly 17 depends downwardly substantially vertically with respect to the frame member 11 when in its extended position to support the motorcycle frame from the ground G in the manner illustrated in FIG. 1.

The leg assembly 17 is pivotally mounted to the frame member 11 by means of a threaded rod, or bolt, 19 passing through a horizontal bushing 18 mounted at the upper end of the leg assembly 17 outboard of the frame member 11. The rod 19 extends transversely of the motorcycle frame passing through the left hand frame member 11 and the right hand frame member (not shown) where it mounts a companion leg assembly (not shown) like the leg assembly 17. Thus, each leg assembly, such as the leg assembly 17, can be stowed in a compact retracted configuration as illustrated in FIG. 2 and pivoted into an erect usage configuration illustrated in FIG. 3.

The leg assembly 17 is capable of being locked securely in both the stowage and usage positions. To this end, a releasable latching, or locking, assembly is mounted at the upper end of the leg assembly 17 and cooperates with the frame member 11 to effect the desired locking action. The locking assembly includes a locking bolt 22 having a downturned handle 23 which enables the locking bolt 22 to be displaced laterally into and out of engagement either with the underside 11a of the frame member 11 as illustrated in FIG. 5 or with the topside 11b of the frame member 11 in the manner illustrated in FIG. 4. The locking bolt 22 slides horizontally in trunnions 24 and 25 and has a collar 26 secured thereto. A helical compression spring 27 is interposed between the collar 26 and the trunnion 24 for the purpose of biasing the locking bolt 22 rightward (in FIG. 5) into engagement with the frame member 11. A triangular gusset plate 28 extends laterally inward to engage the underside 11a of the frame member 11 forwardly of the locking bolt 22. Thus, when extended and locked, the gusset plate 28 cooperates with the locking bolt 19 to prevent the leg assembly 17 from rotating clockwise from the position illustrated in FIG. 3. In a similar manner, engagement of the locking bolt 22 with the underside 11a of the frame 11 prevents the leg assembly 17 from rotating counterclockwise. Thus, the leg assembly 17 is positively secured when extended and latched so that the motorcycle is supported safely and securely.

The leg assembly 17 is adjustable lengthwise. For this purpose, the leg assembly 17 includes an outer tubular member 20 and an inner rod member 21 telescopically received therein. The inner rod member 21 is releasably locked in selected extended positions with respect to the outer tubular member 20 by a cooperating pin and slot arrangement.

As best seen in FIG. 3, the outer tubular member 20 has a slot with an elongated portion 20a extending lengthwise therein and a pair of locking portions 20b and 20c offset laterally therefrom. The inner rod member 21 mounts a bolt, or pin, 21a which protrudes laterally therefrom and is slidably received in the slot. The locking portions 20b and 20c of the slot incline upwardly to return a slight distance along the elongated portion 20a of the slot 20. Thus, depending wall portions 20' and 20" of the tubular member 20 are interposed between the upper ends of the locking portions 20b and 20c of the slot and the elongated portion 20a thereof.

To facilitate positioning the pin 21a in the locking portion of the slot, a means is provided for turning one leg member relative to the other during extension. For this purpose, the slot has a pair of inclined camming sections 20d and 20e located adjacent the locking portions 20b and 20c, respectively. The camming sections 20d and 20e cooperate with the pin 21a to turn the rod 21 through an angle during outward extension of the rod 21 relative to the tubular wall 20. This aligns the pin 21a with the locking portion 20b of the slot so that when the rod 21 is pushed inwardly in the opposite direction, it is guided automatically into proper engagement with the locking portion of the slot. When so engaged, as the manner in which the pin 21a is engaged in the slot locking portion 20c, the depending portion 20" of the tubular wall 20 engages the pin 21a and prevents the rod 21 from turning in the opposite direction, thereby ensuring that the rod 21 is maintained in its telescopically extended position with respect to its tubular receiving member 20. If desired, the rod 21 can also be turned by means of the handle 33 which extends laterally from the lower end of the rod 21.

Retraction of the rod member 21 relative to the tubular member 20 is effected by first extending the rod member 21 a slight distance and then turning the same through a slight angle to align the pin 21a with the elongated portion 20a of the slot and thereafter pushing the rod member 21 upwardly until the pin 21a engages the upper end of the slot such as in the manner illustrated in FIG. 2. When thus engaged, the pin 21a can be turned in to tighten the same and thereby to lock the rod 21 in the tubular member 20 in the retracted configuration illustrated in FIG. 2.

The leg assemblies depend from the motorcycle frame at a slight outward angle with respect thereto in order to enhance the stability of the jack stand. Preferably, the leg assemblies each form an angle of about six degrees with respect to vertical. Because of the angle, the bottom of the rod member 21 is provided with a pad 30 which is mounted thereto by means of a swivel connection provided by a slotted stanchion 31 loosely received on a transverse pin 32. The swivel connection of the pad 30 to the rod member 21 accommodates the aforementioned angular disposition of the leg assembly and assists in jacking the motorcycle as will be described.

The rear wheel 13 of the motorcycle 10 is jacked from the ground G by rocking the motorcycle from side to side while manipulating the rear leg assemblies. For instance, when the left hand leg assembly 17 is first pivoted and locked in the position illustrated in FIG. 3, the pin 21a of the inner rod member 21 is located at a level above the level of the locking portion 20b of the slot. By tilting the motorcycle to the right, i.e. in a direction away from the reader in FIG. 1, the rod 21 falls by gravity out of the tubular member 20. This causes the pin 21a to slide down the elongated portion 20a of the slot until it engages the camming portion 20d, whereupon the rod 21 is turned slightly. This slight turning motion aligns the pin 21a with the inclined locking portion 20b of the slot, so that when the motorcycle is tilted leftward, i.e. toward the foreground in FIG. 1, the rod 21 moves upwardly in the tubular member 20 and causes the pin 21a to advance upwardly into the locking portion 20b of the slot. The motorcyclist then walks around to the opposite side of the motorcycle and performs the same tilting function with respect to the right hand leg assembly. To jack the motorcycle higher, the same steps are repeated until the pin 21a is engaged in the lowermost slot locking portion such as in the manner in which the pin 21a is shown engaging the locking portion 20c of the slot in FIG. 3.

To lower the rear wheel 13 from its jacked-up position, the motorcycle is tilted slightly either to the right or to the left, thereby enabling the rod member 21 to extend itself slightly and the pin 21a to drop out of the locking portion 20c of the slot in the tubular member 20. Thereafter, the motorcyclist can turn the rod member 21 with his foot by engaging it with the handle 33 to align the pin 21a with the elongated portion of the slot. Then, when the motorcycle 10 is allowed to tilt in the opposite direction, it causes the rod member 21 to telescope within the tubular member 20, either all the way to the top, or into the intermediate locking portion 20b, depending upon whether or not the cyclist simply wishes to lower the wheel 13 slightly or to lower it all the way to the ground G. Thereafter, the latching handle 23 is pulled outwardly to disengage the rod 21 from the lower portion 11a of the frame 11, and the retracted leg assembly 17 is pivoted counterclockwise into the position illustrated in FIG. 2, whereupon the handle 23 is biased inwardly by means of the spring 27 to cause the bolt 22 to engage the topside 11b of the frame 11. If desired, the head of the pin, or bolt, 21a may then be tightened to prevent the rod member 21 from inadvertently extending when the motorcycle is in use.

The front wheel 12 is supported off the ground G by the front jack stand 14. As best seen in FIGS. 8-11 (sheet 2) the front jack stand 14 comprises a leg assembly of a pair of legs 40 and 41 pivotally mounted at their upper ends to a transverse motorcycle frame member 42 located forward of the engine. The front jack stand 14 is normally retracted and carried by the motorcycle alongside its frame, such as in the manner illustrated in FIG. 11 when the motorcycle is being ridden and is extended such as in the manner illustrated in FIGS. 1 and 8 when supporting the front wheel 12 off the ground G.

To this end, the legs 40 and 41 of the front leg assembly 14 are pivotally connected to the frame member 42 by means of a hinge assembly. As best seen in FIG. 10, the hinge assembly comprises a flange 43 which engages the underside of the frame member 42 and which is secured thereto by means of bolts 44a, 44b. The flange 43 is welded to an elongated horizontally extending journal 45 having a pair of downturned protrusions 46 and 47 at its opposite ends. The journal 45 extends between the insides of the upper ends 40a and 41a of the legs 40 and 41, respectively. An elongated bolt 47a extends horizontally through holes in the upper ends 40a and 41a of the legs and through the journal 45 to pivotally connect the legs 40 and 41 to the transverse frame member 42. A brace 48 is welded across the legs 40 and 41 below their upper ends 40a and 41a as illustrated in FIG. 9 to connect the legs 40 and 41 together.

For the purpose of releasably securing the legs 40 and 41 either in the extended position illustrated in FIG. 8 or in the retracted position illustrated in FIG. 11, a latching assembly is provided. As best seen in FIG. 9, the latching assembly includes a tube 50 extending horizontally between the depending journal protrusions 46 and 47. The tube 50 slidably mounts therewithin a pair of bolts 51 and 52 having operators 53 and 54 protruding through L-shaped slots in the tube 50. Preferably, the bolts 51 and 52 are biased into their laterally outward extended positions illustrated in FIG. 9 by means of a compression spring (not shown) carried therebetween within the tube 50. The bolts 51 and 52 may be displaced axially inward of the tube 50 by engaging the operators 53 and 54 between the thumb and forefinger and drawing them together. The bolts 51 and 52 may then be locked in their indrawn positions by pivoting them and engaging the operators 53 and 54 in the downturned portions of the tube slots.

For the purpose of locking the leg assembly 14 in either its extended usage position or in its retracted stowage position, the upper end of each leg is provided with a pair of bored ears, such as the ears 55 and 56 provided at the upper end of the leg 40. The bores in the ears 55 and 56 are adapted to receive the outer end of the bolt 52 either to lock the leg assembly 14 in the extended position as illustrated in FIG. 9, wherein the bolt 52 is received in the bore of the lower ear 55, or in the retracted position illustrated in FIG. 11, wherein the bolt 52 is received in the bore of the upper ear 56. Thus, the bolts 51 and 52 cooperate with the lower ears on both legs to prevent the leg assembly 14 from pivoting either clockwise or counterclockwise when locked in the extended position. To aid in aligning the bolts with the lower ears, the journal member 45 is provided with a pair of cylindrical stop members 58 and 59 which extend laterally outward beyond the ends of the journal member 45 and which are adapted to engage the upper ears, such as in the manner in which the stop 59 engages the upper ear 56 on the leg 40 as illustrated in FIG. 8.

The lengths of the legs 40 and 41 are adjustable. To this end, each leg, such as the leg 40, telescopically mounts a tubular extension 50 which has a slot with an elongated portion 60a extending lengthwise therein. The slot has a reversely-turned, laterally offset, locking portion 60b which is adapted to receive a pin, or bolt, 61 threaded into the leg 40. The locking portion 60b of the slot declines downwardly at an acute angle from the upper end of the slot so that a web 60' of the tubular extension 60 is interposed between the shank of the bolt 61 and the elongated portion 60a of the slot when the extension member 60 is fully extended and locked, such as in the manner illustrated in FIGS. 8 and 9. The opposite leg 41 has an extension 62 of like construction.

When the motorcycle is being ridden, the extensions 60 and 62 are normally carried in their retracted positions, such as illustrated in FIG. 11 wherein the bolt 61 engages in the bottom of the elongated slot portion 60a. To raise the front wheel 12 of the motorcycle 10, however, the leg assembly 14 is unlocked and pivoted from its retracted position, such as illustrated in FIG. 11, into an extended position wherein the legs 40 and 41 incline toward the rear of the motorcycle 10. The extensions 60 and 62 are then extended by pulling the same lengthwise until the pins engage the upper end of the elongated slot portions, whereupon the extensions are rotated through a slight angle and pushed upwardly to cause the pins to engage in the locking portions of the slots. Thereafter, the motorcycle 10 is tilted upwardly about a transverse horizontal axis relative to the rear jack assembly 15 to raise the front wheel 12 and the leg assembly 14 is pivoted clockwise into the position illustrated in FIG. 1. The front of the motorcycle is allowed to tilt downwardly, whereupon the weight thereof is transferred to the front leg assembly 14 for supporting the front wheel 12 from the ground G in the manner illustrated in FIG. 1. The front leg assembly 14 is arranged for stowage by reversing the aforementioned procedure.

In view of the foregoing, it should be apparent that the present invention now provides an improved motorcycle jack stand which is capable of supporting a motorcycle safely and securely for servicing while being carried in a compact stowage position when not in use. The jack stand assembly of the present invention is relatively simple in construction and can, therefore, be manufactured readily.

While a preferred embodiment of the present invention has been described in detail, various modifications, alterations and changes may be made without departing from the spirit and scope of the present invention as defined in the appended claims.

I claim:

1. A jack stand for use in supporting a motorcycle frame, comprising:
   a pair of telescopic leg assemblies,
   means mounting each leg assembly to pivot relative to said motorcycle frame,
   means for releasably latching each leg assembly in either a retracted position extending alongside said frame or in an extended position depending therefrom,
   each telescopic leg assembly including:
      a first tubular member,
      a second member telescopically received in said first tubular member,
      pin means protruding laterally from one of said members,
      means defining a slot in the other of said members for slidably receiving said pin means,
   said slot means having an elongated portion extending lengthwise of said other member and a locking portion disposed laterally of said elongated portion and returning alongside said elongated lengthwise extending portion at an acute angle relative thereto, said slot means having a tapered camming section adjacent to a lower portion of said locking portion, said elongated lengthwise extending portion of said slot means cooperating with said pin means to permit outward telescopic movement of one member relative to the other and said locking portion of said slot cooperating with said pin means to prevent inward telescopic motion of sid one member after having been extended outwardly, rotated through an angle and displaced axially inward to position said pin means in the locking portion of the slot, said tapered camming section cooperating with said pin means as it moves downwardly in the slot to rotate the second member automatically relative to the first member for positioning the pin means adjacent to the locking portion of the slot and out of alignment with the elongated portion thereof,
whereby the motorcycle can be jacked up by rocking the same from side to side.

2. The jack stand according to claim 1 wherein said elongated portion of said slot means extends along a substantial portion along the length of said other member and said locking portion is located at one end thereof.

3. The jack stand according to claim 2 wherein said locking portion of said slot means is located adjacent the lower end of said elongated slot portion and inclines upwardly with respect thereto.

4. The jack stand according to claim 3 wherein said slot means has at least one other locking portion like said one locking portion and located intermediate its ends to permit said members to be releasably engaged in selected telescopic positions.

5. The jack stand according to claim 4 including a lateral arm extending from said one member adjacent its lower end for pivoting said one member relative to the other to displace the pin means into and out of locking engagement with the locking portion of said slot means.

6. The jack stand according to claim 4 including a ground-engaging pad carried at the bottom of said one member, and swivel means mounting said pad to said one member to permit said member to pivot relative to the ground when locked and extended.

7. The jack stand according to claim 1 wherein said releasable latching means includes a gusset member extending laterally from said first tubular member and adapted to engage the underside of said frame when said tubular member is extended, and a laterally movable bar adapted to engage said frame in one position wherein said leg assembly is disposed substantially parallel to the frame or in another position wherein said leg assembly is disposed substantially perpendicular to the frame.

8. The jack stand according to claim 2 wherein said locking portion is located at the upper end of said slot and declines downwardly with respect thereto.

9. The jack stand assembly according to claim 8 wherein said leg assemblies are connected together to pivot in common with respect to a front portion of said frame, and said releasable latching means includes a pair of laterally movable catches mounted adjacent the upper ends of said leg assemblies and a pair of keepers adapted to engage said catches in either one position wherein said leg assemblies are disposed in a retracted position substantially parallel to said frame or in another position wherein said leg assemblies are disposed in an extended position at a substantial angle to said frame.

10. A motorcycle jack stand, comprising:

a pair of leg assemblies pivotally mounted to the frame of said motorcycle outboard of and intermediate its front and rear wheels, means for releasably locking said leg assemblies either in one position alongside said frame or in another position depending therefrom, each leg assembly including:
- a first tubular member,
- a second member telescopically received in said first member,
- pin means protruding laterally from one of said members,
- means defining a slot in the other of said members for slidably receiving said pin means, said slot means having an elongated portion and a plurality of locking portions extending laterally of said elongated portion and inclined upwardly with respect thereto, means for rotating one of said members relative to the other for engaging and disengaging said pin means and said locking portion of said slot, said rotating means including means providing a tapered camming surface adjacent to each of said locking portions of said slot means for automatically rotating said pin means theretoward as said one member telescopes outwardly relative to the other, said pin means being movable in said elongated portion of said slot during extension and retraction of said members, and adapted, when rotated in one direction into engagement with the locking portion of the slot, to prevent inadvertent reverse rotation and thereby to maintain outward telescopic extension of said members, said slot and pin means of said leg assembly members cooperating as the motorcycle frame is rocked from side to side to jack the motorcycle off the ground.

* * * * *